(12) United States Patent
Bauermeister et al.

(10) Patent No.: US 7,703,013 B1
(45) Date of Patent: Apr. 20, 2010

(54) METHODS AND APPARATUS TO REFORMAT AND DISTRIBUTE CONTENT

(75) Inventors: Benjamin P. Bauermeister, Seattle, WA (US); Michael S. De Laurentis, Seattle, WA (US)

(73) Assignee: Adobe Systems Inc., San Jose, CA (US)

( * ) Notice: Subject to any disclaimer, the term of this patent is extended or adjusted under 35 U.S.C. 154(b) by 1282 days.

(21) Appl. No.: 11/204,777

(22) Filed: Aug. 16, 2005

(51) Int. Cl.
*G06F 17/00* (2006.01)
(52) U.S. Cl. .................................................. 715/255
(58) Field of Classification Search ................ 715/200, 715/255, 838, 751
See application file for complete search history.

(56) References Cited

U.S. PATENT DOCUMENTS

| | | | | |
|---|---|---|---|---|
| 6,693,652 B1 * | 2/2004 | Barrus et al. | ................ | 715/838 |
| 6,708,309 B1 * | 3/2004 | Blumberg | ................ | 715/209 |
| 6,728,784 B1 * | 4/2004 | Mattaway | ................ | 709/245 |
| 6,928,620 B1 * | 8/2005 | Crangle et al. | ................ | 715/769 |
| 6,971,065 B2 * | 11/2005 | Austin | ................ | 715/763 |
| 7,107,516 B1 * | 9/2006 | Anderson et al. | ................ | 715/210 |
| 7,242,389 B1 * | 7/2007 | Stern | ................ | 345/158 |
| 7,464,137 B2 * | 12/2008 | Zhu et al. | ................ | 709/204 |
| 7,496,841 B2 * | 2/2009 | Hadfield et al. | ................ | 715/255 |
| 2002/0052974 A1 * | 5/2002 | Saito | ................ | 709/247 |
| 2002/0070968 A1 * | 6/2002 | Austin et al. | ................ | 345/764 |
| 2002/0085030 A1 * | 7/2002 | Ghani | ................ | 345/751 |
| 2002/0087592 A1 * | 7/2002 | Ghani | ................ | 707/500 |
| 2002/0169837 A1 * | 11/2002 | Taranath et al. | ................ | 709/206 |
| 2003/0007000 A1 * | 1/2003 | Carlson et al. | ................ | 345/713 |
| 2003/0037119 A1 * | 2/2003 | Austin | ................ | 709/217 |
| 2003/0077561 A1 * | 4/2003 | Alsop et al. | ................ | 434/408 |
| 2003/0215214 A1 * | 11/2003 | Ma | ................ | 386/52 |
| 2003/0229705 A1 * | 12/2003 | Yohichiroh | ................ | 709/229 |
| 2004/0051732 A1 * | 3/2004 | White et al. | ................ | 345/736 |
| 2004/0117445 A9 * | 6/2004 | Lee et al. | ................ | 709/205 |
| 2004/0148572 A1 * | 7/2004 | Nakanishi et al. | ................ | 715/517 |
| 2004/0158495 A1 * | 8/2004 | Gennaro et al. | ................ | 705/23 |
| 2004/0261023 A1 * | 12/2004 | Bier | ................ | 715/530 |
| 2004/0267700 A1 * | 12/2004 | Dumais et al. | ................ | 707/2 |
| 2005/0005242 A1 * | 1/2005 | Hoyle | ................ | 715/745 |

(Continued)

OTHER PUBLICATIONS

Cockburn et al., WebView: A Graphical Aid for Revisiting Web Pages, Google Scholar 1999, pp. 1-7.*

(Continued)

*Primary Examiner*—Cong-Lac Huynh
(74) *Attorney, Agent, or Firm*—Chapin IP Law, LLC (57) ABSTRACT

To create a thumbnail version of an image associated with respective content (e.g., a web page), a computer process herein receives an identification of content formatted according to a first format. Based on the identification of the content to be converted into a thumbnail, the computer invokes a first service to utilize the content formatted according to the first format (e.g., HTML) and produce a rendition of the content according to a second format (e.g., a PDF format). The computer then invokes a second service to produce a rendition of the content according to a third format based on the rendition of the content according to the second format. The format of the thumbnail has a lower resolution compared to a respective imaging resolution associated with the PDF format to reduce network resources required to transfer the thumbnail rendition of the content to other users in a collaborative whiteboard session.

28 Claims, 7 Drawing Sheets

U.S. PATENT DOCUMENTS

| | | | |
|---|---|---|---|
| 2005/0066280 A1* | 3/2005 | Austin et al. | 715/733 |
| 2005/0084087 A1* | 4/2005 | Rajagopalan et al. | 379/205.01 |
| 2005/0210111 A1* | 9/2005 | Fukudome | 709/206 |
| 2005/0262438 A1* | 11/2005 | Armstrong et al. | 715/523 |
| 2006/0080432 A1* | 4/2006 | Spataro et al. | 709/224 |
| 2006/0080593 A1* | 4/2006 | Hudspith et al. | 715/501.1 |
| 2006/0085743 A1* | 4/2006 | Baudisch et al. | 715/526 |
| 2006/0174198 A1* | 8/2006 | Brown et al. | 715/530 |
| 2006/0225032 A1* | 10/2006 | Klerk et al. | 717/105 |
| 2008/0273079 A1* | 11/2008 | Campbell et al. | 348/14.08 |
| 2008/0276185 A1* | 11/2008 | Pry | 715/760 |

OTHER PUBLICATIONS

Lam et al., Summary Thumbnails: Readable Overviews for Small Screen Web Browsers, ACM 2005, pp. 1-10.*

Wobbrock et al., WebThumb: Interaction Techniquws for Small Screen Browsers, ACM 2002, pp. 205-208.*

Foote et al., Reach-Throgh-the-Screen: A New Metaphor for Remote Collaboration, Google 2004, pp. 73-80.*

Leigh et al., Amplified Collaboration Environments, Google 2002, pp. 1-9.*

Guimbretiere et al., Fluid Interaction with High-resolution Wall-size Displays, ACM 2001, pp. 21-30.*

Russell et al., Social Aspects of Using Large Public Interactive Displays for Collaboration, Google 2002, pp. 229-236.*

* cited by examiner

METHODS AND APPARATUS TO REFORMAT AND DISTRIBUTE CONTENT

BACKGROUND

Software application programs have long been used to perform tasks for computer users. For example, one type of software application programs supports collaboration in which multiple users at remote locations of a network can easily convey information to each other. In such a software application, a server disposed in the network typically maintains communication links with each of multiple clients that display respective collaboration windows (e.g., a whiteboard) to viewers. When one of the viewers modifies contents of his collaboration window, the server receives an indication of the changes and notifies all other collaboration windows of the changes so that each collaboration window in the network displays the same information to all users. Consequently, a user at a first remote location can communicate with one or more users at respective one or more other remote locations in the network and vise versa.

One type of information that can be displayed in a respective collaboration window is text. For example, a user can type in text at a respective collaboration window. As the user types the text, the collaboration server learns of the changes made to the respective user collaboration window by the user. To synchronize the collaboration windows, the server populates the other collaboration windows with the text typed in by the user so that each user views the same information.

Another type of information that can be displayed in a respective collaboration window is a picture. For example, a user can initiate inclusion of a digital picture in a respective collaboration window for viewing by all other users. In this case, to synchronize the collaboration windows, the server retrieves a copy of the newly added picture that is presented in the collaboration window and populates the other collaboration windows with the same digital picture so that each user again views the same information. The time and resources required to retrieve a copy of the picture and distribute it to the other users can be quite substantial since a single picture can be on the order of millions of pixels in resolution.

SUMMARY

Conventional whiteboard applications and similar types of data "sharing" applications are quite useful because they enable viewers at different remote locations of a network to easily convey information to each other via a common forum. However, conventional whiteboard applications do not provide an easy way for a viewer at one whiteboard to generate "user-friendly" visual representations of respective content for other viewers. That is, a viewer may wish to add selected content into a collaboration window for viewing by other viewers at respective remote locations. Conventional software applications do not enable packaging of a representation of the selected content (e.g., dragged and dropped into a collaboration window) in a way that is particularly helpful for the other viewers in the collaboration system to quickly preview images associated with the content added to the collaboration window. That is, other viewers using respective collaboration windows must actually receive the content (e.g., a potentially large file) to their respective computer systems in order to view details of the content on a respective display screen. A respective distribution of a large file to many collaboration windows can consume a considerable amount of network resources as well as consume considerable memory resources in a client machine that is used for viewing the content. Consequently, conventional collaboration windows have limited usefulness.

Techniques discussed herein deviate with respect to conventional applications such as those discussed above as well as additional techniques also known in the prior art. In particular, certain embodiments herein are directed to enabling generation of a reduced resolution visual representation of content such as a thumbnail, icon, etc. in response to receiving input such as a web page identifier, a file identifier, image file, etc.

In an example embodiment, to create a thumbnail rendition of content, a computer process herein receives an identification of content which is formatted according to a first format such as HTML (HyperText Markup Language). Based on the identification of the content to be converted into a thumbnail, the computer retrieves the content and invokes a first service to utilize the content formatted according to the first format and produce a rendition of the content according to a second format (e.g., a PDF format). In the present example embodiment, assume that the computer process converts the HTML file associated with the content into a PDF format. The computer then invokes a second service to produce a rendition of the content according to a third format. For example, the computer system converts the content according to the PDF format into a thumbnail rendition of the content. According to the present example embodiment, the third format (for creating the thumbnail rendition of the content) supports reduced resolution imaging compared to a respective imaging resolution supported by the PDF format of the content (e.g., second format) and therefore reduces a memory space requirement associated with storing the content. When used in a network environment, the thumbnail rendition of content can be more quickly communicated to other whiteboard users associated with a collaboration session compared to sending an original, higher resolution imaging version of the content.

In one embodiment, a server that manages a collaborative whiteboard application implements the above computer process to generate the thumbnail rendition of content based on input from a whiteboard user that wishes to display the identified content (or a thumbnail rendition derived thereof) to other whiteboard users. That is, a user can drag and drop a URL into a collaboration window to notify server of particular content the user wants distributed to other collaboration window users. After generating the thumbnail rendition of the content (e.g., based on the URL), the server initiates display of the thumbnail rendition of the content to the remote viewers in lieu of downloading an "original" copy of a respective file, web page, etc. to each collaboration window in the collaboration system for viewing a full visual representation of the content. Although the thumbnail rendition of the content has a reduced resolution, the thumbnail rendition of the content can include enough detail so that a viewer can at least get a general sense of the content (e.g., image or images) based on viewing the thumbnail rendition of content.

In further embodiments, the server initiates population of the thumbnail rendition of content to each of the multiple whiteboard users in a respective collaborative session. If a respective viewer wishes to view the original content in a corresponding higher resolution format than the thumbnail rendition of the content, the viewer can select (e.g., click on the thumbnail rendition of the content) to initiate a download of the original content used to generate the thumbnail rendition of the content. In other words, the thumbnail rendition of the content can be configured to include an address enabling retrieval of the original content. Accordingly, a viewer can initiate retrieval the original content such as a web page, picture, viewable document, etc. and view the content in a respective native application normally used to view the content for more detailed viewing.

Additional embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment herein. This latter embodiment provides an automated way of converting an image associated with content into a lower resolution thumbnail rendition of the content.

Yet other embodiments herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for generating a thumbnail rendition associated with selected content. The instructions, when carried out by a processor of a respective computer device, cause the processor to perform the steps of: i) receiving an identification of content formatted according to a first format; ii) based on the identification of content, invoking a first service to utilize the content formatted according to the first format and produce a rendition of the content according to a second format; iii) invoking a second service to produce a rendition of the content according to a third format based on the rendition of the content according to the second format, the third format having reduced resolution compared to a respective resolution associated with the second format; and iv) initiating display of the rendition of the content formatted according to the third format. Other embodiments of the present application include software programs to perform any of the method embodiment steps and operations summarized above and disclosed in detail below.

Yet a further embodiment herein includes a computer readable medium encoded to perform operations of: i) receiving an identification of a browser page; ii) initiating conversion of a visual rendering of the browser page into a reduced size format that, when displayed in a viewing region of a display screen, appears as a reduced size visual rendering of the browser page; and iii) initiating display of the reduced size visual rendering of the browser page to enable retrieval of the browser page based on selection of the reduced size visual rendering of the browser page. According to such an embodiment, therefore, a computer process herein can receive a web page identifier such as a URL, retrieve a copy of the web page, and convert an image associated with the web page into a miniature visual representation of the web page such as a thumbnail. The thumbnail enables a viewer to at least get a general sense of the contents of a web page without having to retrieve and display a "full blown" image of the web page.

As discussed above, techniques herein are well suited for generating miniature visual representations of content (e.g., a thumbnail) for use in applications such as collaborative whiteboard sessions. However, it should be noted that embodiments herein are not limited to use in such applications and that the techniques discussed herein are well suited for other applications as well.

It is to be understood that the system according to an embodiment herein can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA. Additional features of the embodiments herein will be further discussed in the Detailed Description section of this application and accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment, to create a thumbnail version of an image associated with respective content (e.g., a web page), a computer process herein receives an identification of content formatted according to a first format such as HTML. Based on the identification of the content to be converted into a thumbnail, the computer process invokes a first service to utilize the content formatted according to the first format (e.g., HTML) and produce a rendition of the content according to a second format (e.g., a PDF format). The computer then invokes a second service to produce a rendition of the content (e.g., a thumbnail rendition of the content) according to a third format based on the rendition of the content according to the second format. The format of the thumbnail rendition of the content is a lower resolution imaging format compared to a respective resolution imaging format associated with the PDF format. As a result, the content formatted according to the third format can be bundled into a smaller package than a comparable package of content having a higher resolution imaging format such as a rendition of content according to the PDF format. The smaller package according to the PDF format reduces network resources that are required to transfer a rendition of the content to other users in a collaborative whiteboard session.

Figure 1:
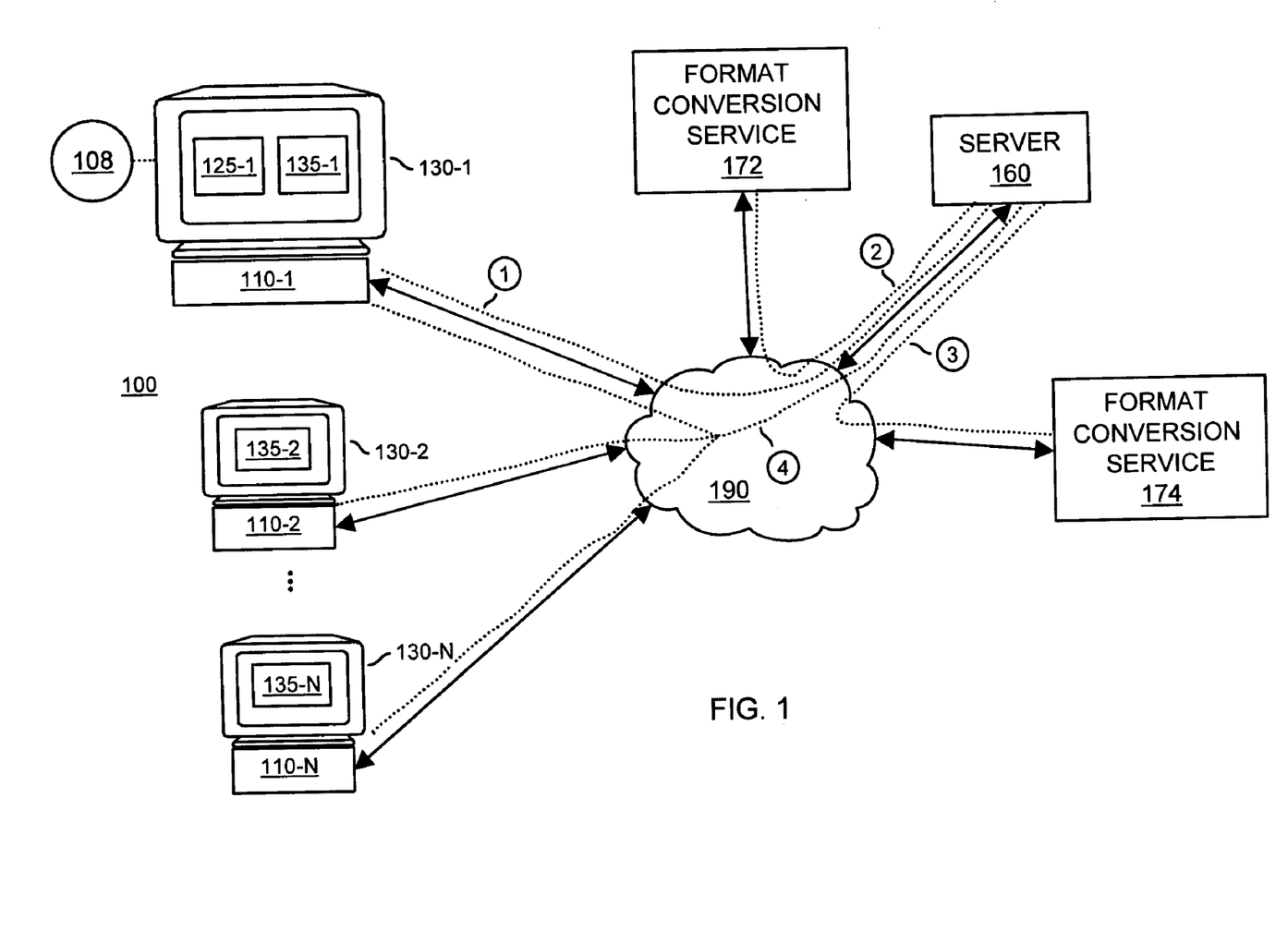
FIG. 1 is a diagram of a network environment supporting generation and distribution of re-formatted content according to an embodiment herein.

FIG. 1 is a diagram of a network environment 100 supporting generation and distribution of reformatted content according to an embodiment herein. As shown, network environment 100 includes computer system 110-1, computer system 110-2, . . . computer system 110-N (collectively computer systems 110), which are each coupled to network 190. Each of the computer systems 110 has an associated display screen 130 for viewing content distributed over network 190. For example, computer system 110-1 includes display screen 130-1, computer system 110-2 includes display screen 130-2, and so on. Each of the display screens 130 displays a respective collaboration window 135 (e.g., a JamJar™ space) so that users at different remote locations in network environment 100 can share information with each other. Network environment 100 also includes server 160 that, according to one embodiment, supports collaboration (e.g., via a JamJar™ software application produced by Adobe™) amongst computer systems 110 by controlling images (e.g., content in general) that appear in respective collaboration windows 135. Server 160 utilizes format conversion service 172 and format conversion service 174 to reformat content according to an embodiment herein.

More specifically, in the context of network environment 100 as in FIG. 1, a technique as further described herein involves use of a server 160 to support collaboration (e.g., a whiteboard application) in which each of multiple viewers at respective remote locations of a network 190 can easily convey information to each other via collaboration windows 135. For example, users associated with computer systems 110 can modify contents of the respective collaboration windows 135 on display screens 130. Server 160 detects changes to the collaboration windows 135 and updates each of the other collaboration windows 135 so that all of the users view the same contents on their respective collaboration windows 135.

As an example of techniques herein, assume that user 108 (e.g., a person utilizing computer system 110-1 viewing display screen 130-1) wishes to add content to his collaboration window 135-1 for viewing by all other viewers in network environment 100. In the present example, assume that viewing region 125-1 of display screen 130-1 displays a browser for surfing the Internet. To convey information to other viewers via collaboration windows 135, the user 108 drags and drops selected content such as a web page identifier (e.g., a URL) from viewing region 125-1 into his collaboration window 135-1. The computer system 110-1 producing the collaboration window 135-1 notifies server 160 that a web page identifier has been dragged and dropped by user 108 into the collaboration window 135-1.

In response to the dragging and dropping of the web page identifier into collaboration window 135-1, the server 160 supporting the collaboration system herein receives an identification (e.g., the web page identifier such as a URL) from computer system 110-1 of the user selected content (e.g., the respective web page associated with the URL dropped into collaboration window 135-1).

Note that although the present example involves receiving a URL as selected by a user 108, the user also can drag and drop other types of identifiers or data in collaboration window 135-1. For example, the user 108 can select a file, image, data, etc. from viewing region 125-1 and drop it in collaboration window 135-1 in a similar way as dragging and dropping the URL into collaboration window 135-1. In the event that the user 108 drags and drops a URL, the server 160 can use the URL to retrieve respective content (e.g., a web page) from another server over network 190. In the event that the user 108 drags and drops an actual file (e.g., including data for producing images) into collaboration window 135-1, the server 160 can receive the selected content directly from computer system 110-1 rather than have to retrieve selected content from another source over network 190. In other words, the sever can receive the content from a respective computer system 110 or some other source in network environment 100.

After receipt of the selected content at the server 160 (whether the server 160 itself retrieves the content from computer system 110-1 or some other source), the server 160 invokes format conversion service 172 to produce a rendition of the selected content according to another format such as PDF (Portable Document Format). In other words, the server 160 utilizes format conversion service 172 to convert the selected content such as an HTML file (if the selected content is a web page identified by a URL) into a PDF format. Many other types of content can be converted into PDF format for displaying images.

Thus far, according to one embodiment herein, the user 108 drags and drops a URL into a respective collaboration window 135-1. In this case, the server 160 receives the URL and retrieves the respective web page associated with the URL. The server 160 thereafter converts the retrieved web page coded according to, for example, HTML (Hyper Text Markup Language) into a PDF format. The server 160 then invokes format conversion service 174 to produce a visual rendition of the content according to yet another format. For example, the server 160 can initiate conversion of retrieved web page content encoded according to a PDF format into a format suitable for producing thumbnail images (e.g., lower resolution images) of the selected content. In lieu of populating collaboration windows 135 with the retrieved HTML file as identified by user 108 or simply the URL in response to dragging and dropping the URL into collaboration window 135-1, the server 160 distributes the thumbnail rendition of the content (e.g., a miniature image of the web page) for display in respective collaboration windows 135.

In general, a thumbnail is a miniature display of a page to be displayed on a respective display screen 130. Thumbnails enable a respective user to see a layout of one or more pages associated with content. Typically, thumbnails are too small to show actual text. If so, greeking can be used to roughly indicate how the text will appear to a viewer if the respective image were enlarged.

Note that either or both of format conversion service 172 and format conversion service 174 can be remote or local processes with respect to server 160. In other words, either or both of these services can reside locally in server 160 rather than at other servers in network 190.

Figure 2:
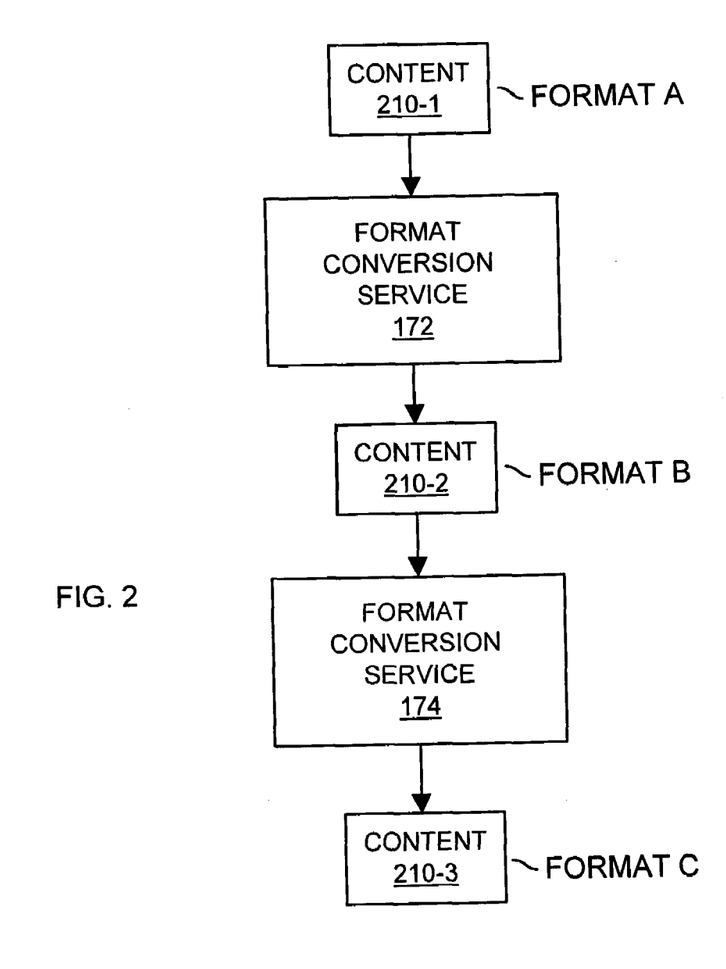
FIG. 2 is a diagram illustrating content format conversions according to an embodiment herein.

FIG. 2 is a diagram illustrating content format conversions according to an embodiment herein. As shown in the processing flow of FIG. 2, server 160 retrieves content 210-1 formatted according to format A. As mentioned, content 210-1 can be any type of information such as a browser page formatted according to HTML, a picture formatted according to JPEG, a text-based document, etc.

Server 160 initiates format conversion service 172 to convert content 210-1 into content 210-2 formatted according to another format such as format B (e.g., a PDF image format). Format B can support high resolution imaging of the content on a respective display screen 130. Additionally, server 160 initiates format conversion service 174 to convert content 210-2 into content 210-3 formatted according to format C such as a lower resolution imaging format than either format A or format B. This reduces a size of a file storing content 210-3.

Figure 3:
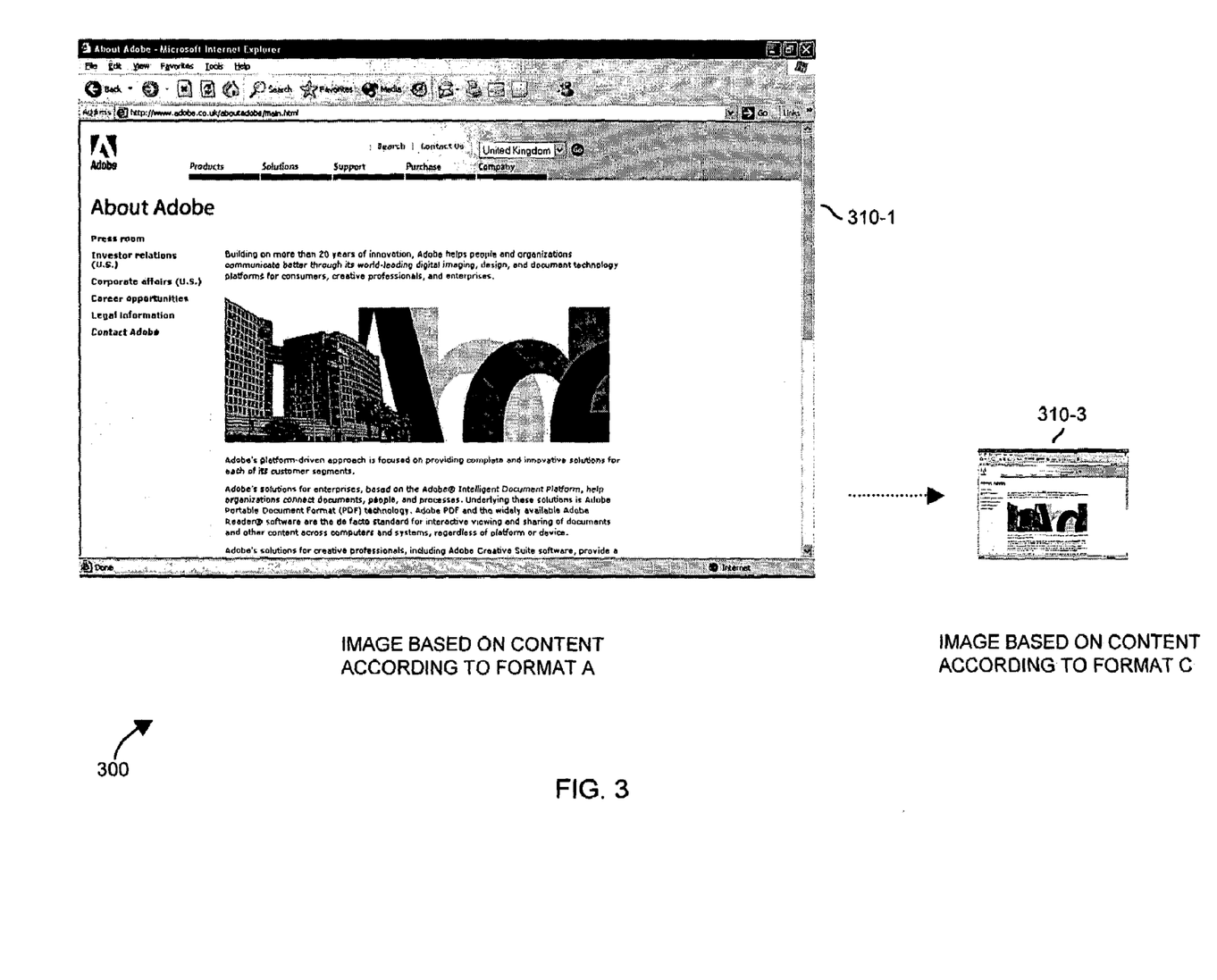
FIG. 3 is a diagram illustrating an image produced as a result of reformatting content according to an embodiment herein.

FIG. 3 is a diagram illustrating a sample image produced as a result of reformatting content into a lower resolution imaging format according to an embodiment herein. For example, as mentioned, a user 108 drags and drops a URL such as http://www.adobe.com/aboutadobe/main.html associated with image 310-1 into collaboration window 135-1. Server 160 retrieves the selected content associated with the web page to produce image 310-1 and generates a thumbnail rendition of the selected content (e.g., as shown by image 310-3) having a lower resolution imaging format as discussed.

In one embodiment, the user 108 can specify the number of dots per inch as well as a size (e.g., in inches) of the image 310-3 to be generated and distributed to the collaboration windows 135 in network environment 100 of FIG. 1. In certain cases, selected content can produce multiple thumbnails depending on settings provided by a respective user. Accordingly, a user 108 can control how the thumbnail rendition of the content (e.g., a miniature representation of a respective retrievable browser page as shown by image 310-3) appears in the collaboration windows 135 of network environment 100 for other viewers.

In furtherance of the above example, consider that sample image 310-1 of FIG. 2 may support full screen viewing on a respective display screen 130 having a field of 1024 by 768 pixels and aspect ratio of 4:3. The selected content (in this example, the web page) can be reformatted (as discussed herein) to produce image 310-3 which supports a fraction (e.g., one-half, one-third, one tenth, etc.) of the resolution supported by formatting used to produce image 310-1. The thumbnail rendition of the content or image 310-3 displayed in respective collaboration windows 135 thus normally will appear in only a portion of the screen, as shown, because it is reduced in size compared to the originally sized image 310-1. Also, because resolution has been reduced, a respective package of data associated with producing image 310-3 can be substantially smaller than a respective file used to produce a high resolution image in a PDF imaging format.

Because the thumbnail image of the browser page (e.g., image 310-3) has a lower resolution than the full resolution image of the original web page (e.g., image 310-1), the server 160 can more quickly disseminate the thumbnail (as opposed to the original content) to notify other users (via use of the thumbnail) in a collaboration session that a viewer dragged an dropped a web page identifier into the collaboration window 135.

In one embodiment, as mentioned, the thumbnail rendition of the content appears in respective collaboration windows 135 takes up only a small portion of a viewing region associated with the respective collaboration windows 135. Thus, other viewers in network environment 100 can view a miniature, lower resolution image of the web page (or other type of selected content as the case may be) in their respective collaboration windows 135 without the server 160 serving the original content or a PDF version of the selected content to all collaboration windows 135.

In a further embodiment, the server 160 associates a respective identifier (e.g., a web page identifier) with the thumbnail rendition of the content (i.e., image 310-3) in order to enable other viewers, when viewing image 310-3 on a respective display screen 130, to select image 310-3 (as it appears in a respective collaboration window 135) and retrieve a respective web page (or file as the case may be) from a server based on the respective identifier. In other words, a viewer of a respective collaboration window 135 can click on image 310-3 shown in a respective collaboration window 135 in order to retrieve an "original" copy of the respective web page or other content from a respective repository associated with network environment 100. As an example, clicking on a thumbnail rendition of the content displayed in a collaboration window 135 causes the respective client computer 110 to initiate retrieval of the actual web page or corresponding PDF file on server 160. The viewers at least can get a general sense of whether they want to retrieve the web page based on the miniature copy of the web page (i.e., the thumbnail rendition of the content) appearing a respective collaboration window 135.

If the selected content happens to be a file (instead of a URL) and the server 160 produces an image based on the file, the server 160 can locally store a copy of the original file for serving to respective viewers of the collaboration system on demand when they click on the thumbnail rendition of the content. In such a case, the thumbnail rendition of the content would have an associated address to retrieve the file from server 160 rather than a URL to a remote web page retrievable from potentially another server in network environment 100. Alternatively, the server 160 does not store a copy of the file, but instead associates an address to the thumbnail rendition of the content so that a respective user at a collaboration window 135 can click on the thumbnail and retrieve an original version of content (for full viewing in lieu of the thumbnail rendition of the content) from a location where the original version of selected content normally resides. As mentioned, server 160 (or other designated repository) can also store a PDF version of the content for retrieval by viewers.

Image 310-3 appearing in collaboration windows 135 can support special functionality enabling a respective viewer of the collaboration window 135 to change an appearance of the thumbnail image of such content. For example, according to one embodiment, a viewer can resize image 310-3 so that it is enlarged for viewing more details associated with the thumbnail rendition of the content without having to retrieve a higher resolution image of the content. If a viewer happens to be interested in viewing more details associated with the content after viewing the thumbnail rendition of the content as discussed, the viewer can retrieve the original content or PDF version of the content, which supports higher resolution imaging of the content and more detailed viewing.

The thumbnail rendition of content can change depending on input from a viewer viewing the thumbnail in a respective collaboration window 135. For example, a viewer can select different modes of a thumbnail rendition of content in a respective collaboration window 135 to view different miniature, lower resolution visual renderings of images associated with the original content. Such an embodiment is beneficial when content includes multiple pages of images and a single thumbnail rendition of content cannot effectively display all of the images at the same time.

Figure 4:
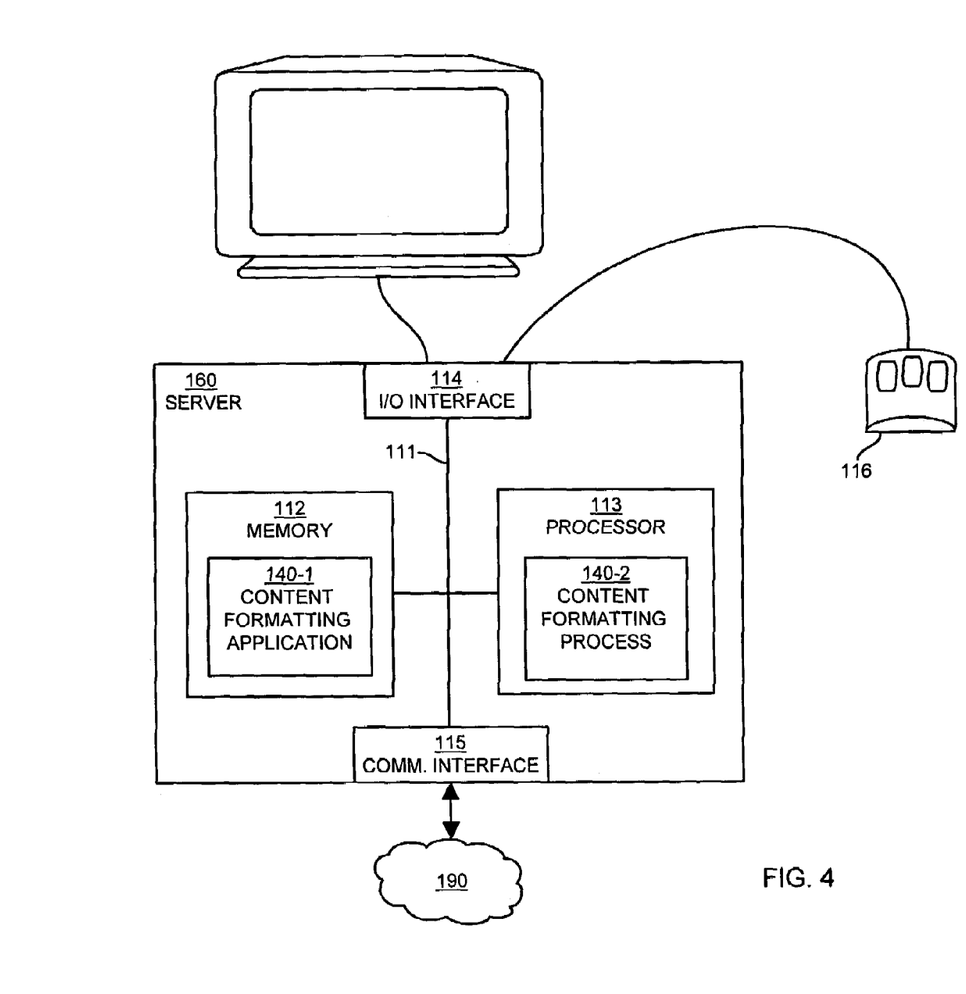
FIG. 4 is a block diagram of a processing device suitable for initiating format conversions and distribution of re-formatted content according to an embodiment herein.

FIG. 4 is a block diagram of a computer environment 200 illustrating an example architecture of a server 160 (e.g., computer system) for implementing a content formatting application 140-1 according to embodiments herein. Server 160 can be a computerized device such as a personal computer, workstation, portable computing device, console, network terminal, processing device, etc. As shown, server 160 of the present example includes an interconnect 111 that couples a memory system 112, a processor 113, I/O interface 114, and a communications interface 115. I/O interface 114 potentially provides connectivity to peripheral devices such as a keyboard, mouse, display screens, etc. Communications interface 115 enables server 160 to communicate over network 190 to retrieve and transmit information from remotely located sources if necessary.

As shown, memory system 112 is encoded with a content formatting application 140-1 that supports reformatting and distribution of content. Content formatting application 140-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the content formatting application 140-1. Execution of the content formatting application 140-1 produces processing functionality in content formatting process 140-2. In other words, the content formatting process 140-2 represents one or more portions of the content formatting application 140-1 performing within or upon the processor 113 in the server 160.

It should be noted that, in addition to the content formatting process 140-2, embodiments herein include the content formatting application 140-1 itself (i.e., the un-executed or non-performing logic instructions and/or data). The content formatting application 140-1 may be stored on a computer readable medium such as a floppy disk, hard disk or in an optical medium. According to other embodiments, the content formatting application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of content formatting application 140-1 in processor 113 as the content formatting process 140-2. Thus, those skilled in the art will understand that the server 160 can include other processes and/or software and hardware components, such as an operating system that controls allocation and use of hardware resources.

Functionality supported by server 160 and, more particularly, functionality associated with content formatting application 140-1 and content formatting process 140-2 will now be discussed via flowcharts in FIGS. 5 through 7. For purposes of this discussion, server 160 or (e.g., content formatting application 140-1 and/or content formatting process 140-2) generally performs steps in the flowcharts.

Note that there will be some overlap with respect to concepts discussed above for FIGS. 1 through 3. Also, note that the steps in the below flowcharts need not always be executed in the order shown.

Figure 5:
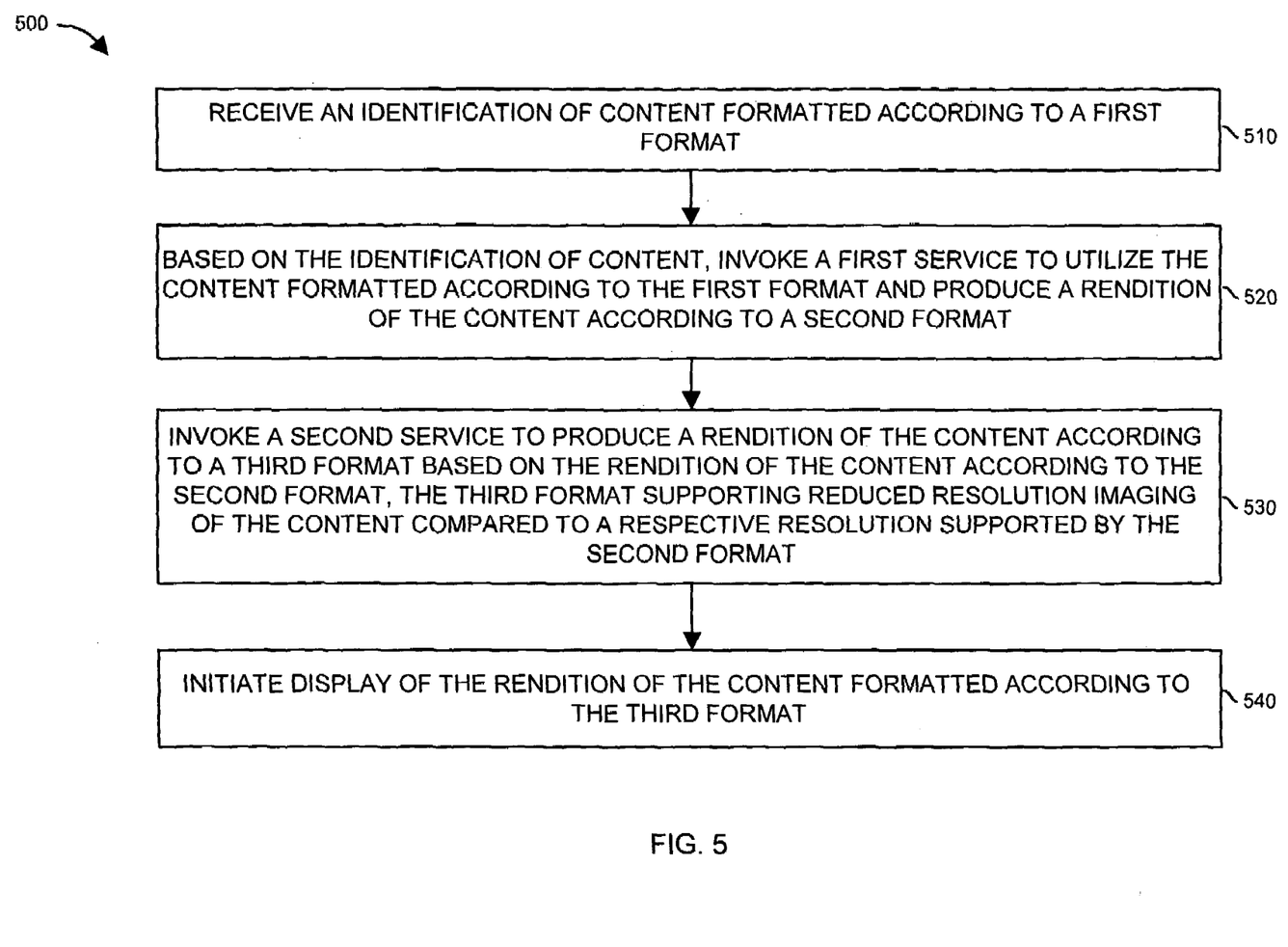
FIG. 5 is a flowchart illustrating techniques associated with re-formatting content according to an embodiment herein.

FIG. 5 is a flowchart 500 illustrating a technique for reformatting and distributing content according to an embodiment herein. References in the flowchart 500 of FIG. 5 will be made to matter previously discussed with respect to FIGS. 1-3.

In step 510, server 160 receives an identification of content formatted according to a first format.

In step 520, based on the identification of content, server 160 invokes format conversion service 172 to utilize the content formatted according to the first format (e.g., HTML format) and produce a rendition of the content according to a second format (e.g., a PDF format).

In step 530, server 160 invokes format conversion service 174 to produce a rendition of the content according to a third format based on the rendition of the content according to the second format. The third format supports reduced resolution imaging of the content compared to a respective resolution supported by the second format.

In step 540, server 160 initiates display of the rendition of the content formatted according to the third format.

Figure 6:
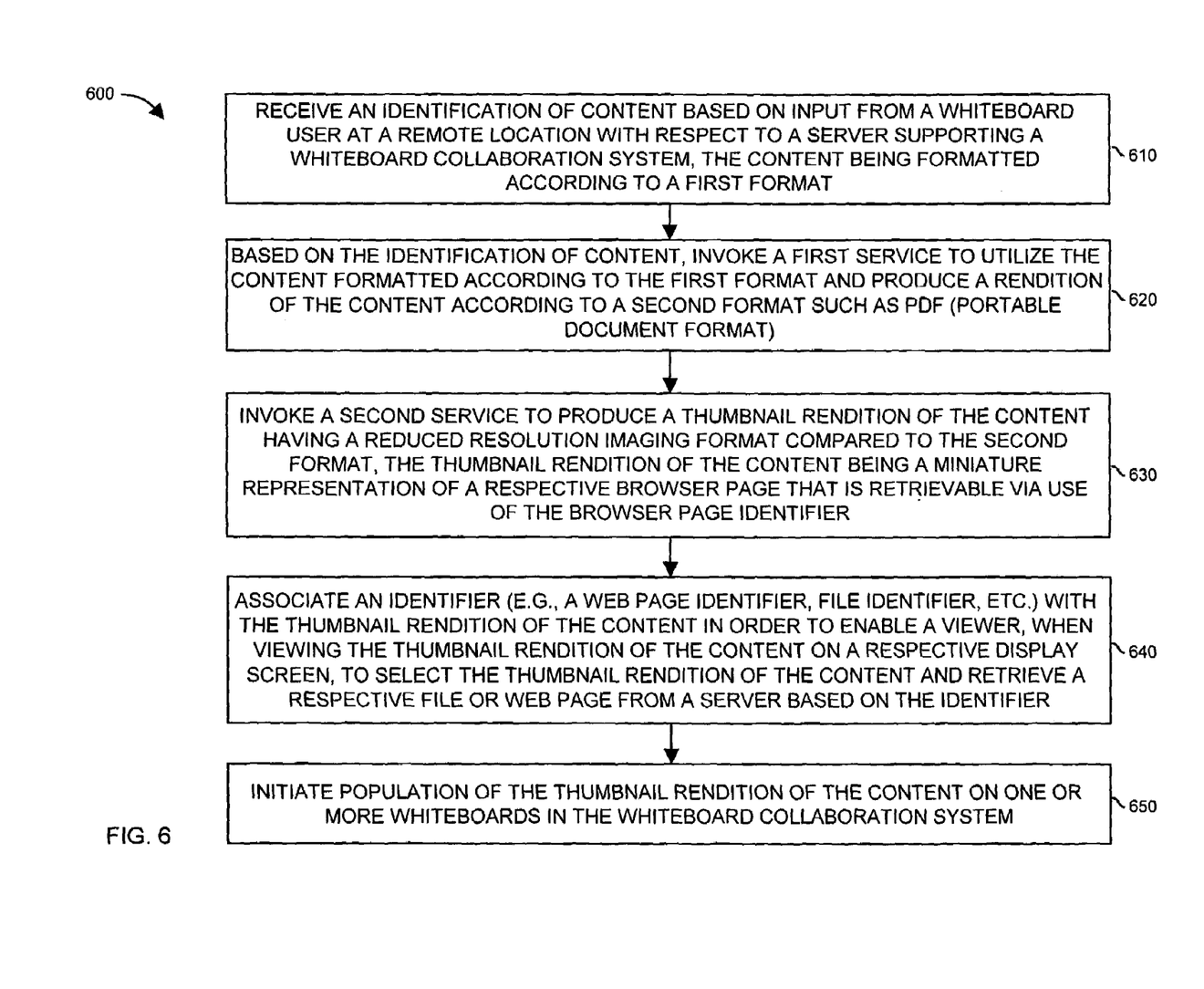
FIG. 6 is a flowchart illustrating techniques associated with formatting content in the context of a collaboration environment according to an embodiment herein.

FIG. 6 is a flowchart 600 illustrating more specific techniques associated with embodiments herein. Note that according to the present embodiment, the steps in flowchart 600 are performed by server 160 but such functionality can be extended to other platforms as well.

In step 610, server 160 receives an identification of content based on input from a user 108 (e.g., a whiteboard user) at a remote location with respect to the server 160. The content is formatted according to a first format such as HTML.

In step 620, based on the identification of content, server 160 invokes format conversion service 172 to utilize the content formatted according to the first format and produce a rendition of the content according to a second format such as PDF (Portable Document Format).

In step 630, server 160 invokes a second service to produce a thumbnail rendition of the content, which is formatted according to a reduced resolution imaging format compared to the second format. In one embodiment, the thumbnail rendition of the content is a miniature representation of a respective browser page that is retrievable via use of the browser page identifier.

In step 640, server 160 associates an identifier (e.g., a web page identifier, file identifier, etc.) with the thumbnail rendition of the content in order to enable a viewer, when viewing the thumbnail rendition of the content on a respective display screen 130, to select the thumbnail rendition of the content and retrieve a respective file or web page from a server based on the identifier.

In step 650, server 160 initiates population of the thumbnail rendition of the content on one or more collaboration windows 135 (e.g., whiteboards) in a whiteboard collaboration system of network environment 100.

Figure 7:
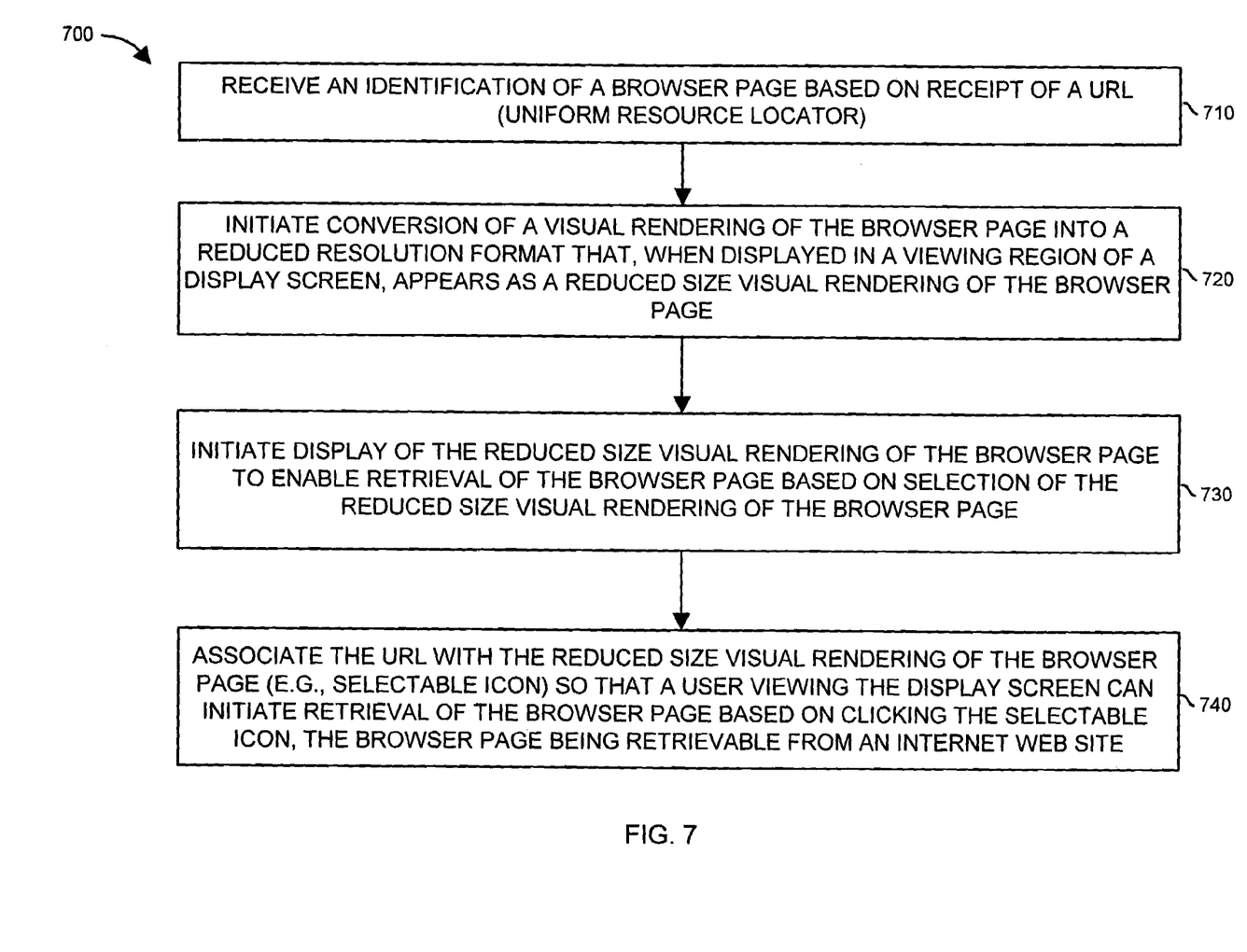
FIG. 7 is a flowchart illustrating techniques associated with reducing a web page image into a thumbnail rendition of the web page according to an embodiment herein.

FIG. 7 is a flowchart 700 illustrating more specific techniques associated with embodiments herein. Note that according to the present embodiment, the steps in flowchart 700 are be performed by server 160.

In step 710, server 160 receives an identification of a browser page based on receipt of a URL (Uniform Resource Locator).

In step 720, server 160 initiates conversion of a visual rendering of the browser page into a reduced resolution format that, when displayed in a viewing region of a display screen, appears as a reduced size visual rendering of the browser page as well as provides a reduced resolution viewing of the browser page.

In step 730, server 160 initiates display of the reduced size visual rendering of the browser page to enable retrieval of the browser page based on selection of the reduced size visual rendering of the browser page.

In step 740, server 160 associates a URL with the reduced size visual rendering of the browser page (e.g., selectable icon) so that a user viewing the display screen can initiate retrieval of the browser page based on clicking the reduced size browser page, the browser page being retrievable from an internet web site.

Note again that techniques herein are well suited for converting selected content into different formats as well as distributing reformatted content in a network environment. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which at least one computer system executes instructions retrieved from computer storage for generating a visual representation of content, the computer-implemented method comprising:
   receiving an identification of content formatted according to a first format;
   based on the identification of content, invoking a first service to utilize the content formatted according to the first format to produce a rendition of the content according to a second format;
   invoking a second service to produce a rendition of the content according to a third format based on the rendition of the content according to the second format, the third format supporting reduced resolution thumbnail imaging of the content compared to a respective resolution supported by the second format;
   initiating display of the rendition of the content formatted according to the third format to collaboration windows of members in a collaboration system; and
   wherein the identification of content is a content identifier and wherein receiving the identification of content occurs in response to a first member of a collaborative whiteboard session in the collaboration system dragging and dropping a visual rendition of the content identifier onto an editable whiteboard for sharing the content as specified by the content identifier with a second member of the collaborative whiteboard session, the second member being at a remote location with respect to the first member;
   wherein invoking the first service includes converting the content into a PDF (Portable Document Format) viewing format; and
   wherein invoking the second service includes converting the content formatted according to the PDF viewing format into a thumbnail rendition of the content, the thumbnail rendition of the content having a reduced resolution format compared to a resolution of the PDF viewing format.

2. A computer-implemented method as in claim 1, wherein invoking the second service to produce the rendition of the content according to the third format results in generation of a thumbnail rendition of the content requiring less memory resources for storage than respective memory resources required to store the rendition of the content according to the second format.

3. A computer-implemented method as in claim 1, wherein the content is a retrievable browser page, the method further comprising:
   retrieving the content over a network from a source other than a client computer providing the identification of the content.

4. A computer-implemented method as in claim 1 further comprising:
   associating a web page identifier with the rendition of content formatted according to the third format in order to enable a viewer, when viewing the rendition according to the third format on a respective display screen, to select the rendition of the content according to the third format and retrieve a respective web page from a server based on the web page identifier, the rendition of the content according to the third format on the respective display screen being a miniature visual representation of the respective web page.

5. A computer-implemented method as in claim 1 further comprising:
   associating the content identifier with the rendition of the content formatted according to the third format in order to enable the second member, when viewing the rendition of the content according to the third format on a respective display screen, to select the rendition according to the third format and retrieve a respective file from a server based on the content identifier, the rendition of the content according to the third format being a miniature visual representation of an image generated based on the respective file.

6. A computer-implemented method as in claim 1, wherein invoking the second service results in generation of a visual representation of the content that can be displayed in a respective display screen for retrieving the content formatted according to the first format, the visual representation being a miniature visual thumbnail representation of at least a portion of the content, the miniature visual thumbnail viewable and selectable by the second member during the collaborative whiteboard session for retrieval of the content.

7. A computer-implemented method as in claim 6, wherein initiating display of the rendition of the content formatted according to the third format includes initiating display of a thumbnail rendition of the content that enables the second member of the collaborative whiteboard session to resize the thumbnail rendition of the content into a larger image without retrieving a higher resolution image of the content.

8. A computer-implemented method as in claim 6, wherein initiating display of the rendition of the content formatted according to the third format includes initiating display of a thumbnail rendition of the content that enables the second member to selectively view respective miniature visual renderings of each of multiple images associated with the content.

9. A computer-implemented method as in claim 1,
   wherein invoking the second service results in generation of a thumbnail that is a miniature representation of a respective browser page, the respective browser page being retrievable via use of the content identifier; and
   wherein initiating display of the rendition of the content formatted according to the third format includes initiating population of the thumbnail in the editable whiteboard on the display screen as well as initiating population of the thumbnail on at least one other respective editable whiteboard operated by the second member during the collaborative whiteboard session.

10. A computer-implemented method as in claim 1, wherein initiating display of the rendition of the content formatted according to the third format includes:
    initiating communication with the second member to forward the thumbnail rendition of content for viewing by the second member, the thumbnail rendition of the content enabling the second member to select and retrieve the content from a server that serves the content according to the first format.

11. A computer-implemented method as in claim 1, wherein the rendition of the content formatted according to the third format is a thumbnail rendition of the content; and wherein initiating display of the rendition of the content formatted according to the third format includes:

initiating communication with the second member to forward the thumbnail rendition of the content for viewing by the second member, the thumbnail rendition of the content including an address, the address used by the second member to retrieve the content from a server that serves the content according to the first format.

12. A computer-implemented method as in claim 11 further comprising:

initiating communication with the first member to forward the thumbnail rendition of the content for viewing by the first member on the editable whiteboard.

13. A computer-implemented method as in claim 12 further comprising:

receiving, from the first member, size information specifying a size of the thumbnail rendition of content distributed to the second member.

14. A computer-implemented method as in claim 13 further comprising:

receiving, from the first member, resolution information specifying a resolution of the thumbnail rendition of content distributed to the second member.

15. A computer-implemented method in which at least one computer system executes instructions retrieved from computer storage for providing a visual representation of a browser page, the computer-implemented method comprising:

receiving a browser page identifier associated with the browser page in response to a first member of a collaborative session of dragging and dropping the browser page identifier onto an editable whiteboard, the first member dragging and dropping the browser page identifier to share the browser page as specified by the browser page identifier with a second member of the collaborative session;

initiating conversion of a visual rendering of the browser page into a reduced resolution format that, when displayed in a viewing region of a display screen, appears as a reduced size visual rendering of the browser page; and initiating simultaneous display of the reduced size visual rendering of the browser page to the first member and the second member of the collaborative session, the reduced size visual rendering enabling retrieval of the browser page based on selection of the reduced size visual rendering of the browser page.

16. A computer-implemented method as in claim 15 further comprising:

associating a URL with the selectable icon so that a user viewing the display screen can initiate retrieval of the browser page based on clicking the selectable icon, the browser page being retrievable from an internet web site.

17. A computer-implemented method as in claim 15, wherein initiating conversion of the visual rendering of the browser page into the reduced size format includes generating the reduced size visual rendering of the browser page based on use of a reduced resolution format.

18. A computer-implemented method as in claim 15, wherein the browser page is formatted according to a first format, and wherein initiating conversion of the visual rendering of the browser page into the reduced size format includes:

implementing a first conversion process to produce a retrievable rendition of the content according to a second format;

implementing a second conversion process to produce a retrievable rendition of the content formatted according to a third format, the third format having reduced resolution compared to a respective resolution associated with the second format.

19. A computer-implemented method as in claim 18, wherein implementing the first conversion process includes converting the visual rendering of the browser page into a PDF format; and wherein implementing the second conversion process includes converting the browser page formatted according to the PDF format to a thumbnail viewable on a respective display screen.

20. A computer program product including a computer readable storage medium having instructions stored thereon for processing data information, such that the instructions, when carried out by a processing device, enable the processing device to perform the operations of:

receiving an identification of content formatted according to a first format;

based on the identification of content, invoking a first service to utilize the content formatted according to the first format to produce a rendition of the content according to a second format;

invoking a second service to produce a rendition of the content according to a third format based on the rendition of the content according to the second format, the third format supporting reduced resolution thumbnail imaging of the content compared to a respective resolution supported by the second format;

initiating display of the rendition of the content formatted according to the third format to collaboration windows of members in a collaboration system; and wherein the identification of content is a content identifier and wherein receiving the identification of content occurs in response to a first member of a collaborative whiteboard session in the collaboration system dragging and dropping a visual rendition of the content identifier onto an editable whiteboard for sharing the content as specified by the content identifier with a second member other members of the collaborative whiteboard session, the second member being at a remote location with respect to the first member;

wherein invoking the first service includes converting the content into a PDF (Portable Document Format) viewing format; and wherein invoking the second service includes converting the content formatted according to the PDF viewing format into a thumbnail rendition of the content, the thumbnail rendition of the content having a reduced resolution format compared to a resolution of the PDF viewing format.

21. A computer program product as in claim 20, wherein invoking the second service to produce the rendition of the content according to the third format results in generation of a thumbnail rendition of the content requiring less memory resources for storage than respective memory resources required to store the rendition of the content according to the second format.

22. A computer program product as in claim 20, the computer program product further supporting operations of:

associating an identifier with the rendition of content formatted according to the third format in order to enable a viewer, when viewing the rendition according to the third format on a respective display screen, to select the rendition of the content according to the third format and retrieve respective data from a server based on the identifier, the rendition of the content according to the third format on the respective display screen being a miniature visual thumbnail representation of the content.

23. A computer program product as in claim 20, wherein invoking the second service results in generation of a visual representation of the content that can be displayed in a respective display screen for retrieving the content formatted according to the first format, the visual representation being a miniature visual thumbnail representation of at least a portion of the content.

24. A computer program product as in claim 20, wherein initiating display of the rendition of the content formatted according to the third format includes initiating display of a thumbnail rendition of the content that enables a viewer to resize the thumbnail rendition of the content into a larger image without retrieving a higher resolution image of the content.

25. A computer program product as in claim 20,
wherein invoking the second service results in generation of a thumbnail that is a miniature representation of a respective browser page that is retrievable via use of the browser page identifier; and
wherein initiating display of the rendition of the content formatted according to the third format includes:
  initiating population of the thumbnail for viewing by the first member; and
  initiating population of the thumbnail for viewing by a second member of the collaborative whiteboard session, the second member being at a remote location over a network with respect to the first member.

26. A computer program product as in claim 20, wherein receiving the identification of content includes receiving the identification from a remote user over a network in response to the remote user selecting from the group consisting of: i) a browser page identifier for conversion of a respective browser page into a thumbnail for viewing a miniature rendition of the respective browser page on a respective portion of a collaborative white board, the miniature rendition being viewed by each of multiple clients on corresponding white boards, and ii) a document identifier for conversion of a respective viewable document into a thumbnail for viewing a miniature display of the respective viewable document on a respective portion of a collaborative white board.

27. A computer program product as in claim 26, wherein initiating display of the rendition of the content formatted according to the third format includes:
  identifying at least one client computer associated with the collaborative whiteboard in which the remote user performs selection of one of the browser page identifier or the document identifier; and
  initiating communication with the at least one client to forward the thumbnail rendition of content for viewing on a respective at least one display screen, the thumbnail rendition of the content enabling a user to select and retrieve the content from a server that serves the content according to the first format.

28. A computer system comprising:
a processor;
a memory unit that stores instructions associated with an application executed by the processor; and
an interconnect coupling the processor and the memory unit, enabling the computer system to execute the application and perform operations of:
  receiving an identification of content formatted according to a first format;
  based on the identification of content, invoking a first service to utilize the content formatted according to the first format to produce a rendition of the content according to a second format;
  invoking a second service to produce a rendition of the content according to a third format based on the rendition of the content according to the second format, the third format supporting reduced resolution thumbnail imaging of the content compared to a respective resolution supported by the second format; and
  initiating display of the rendition of the content formatted according to the third format to collaboration windows of members in a collaboration system; and
  wherein the identification of content is a content identifier and wherein receiving the identification of content occurs in response to a first member of a collaborative whiteboard session in the collaboration system dragging and dropping a visual rendition of the content identifier onto an editable whiteboard for sharing the content as specified by the content identifier with a second member of the collaborative whiteboard session, the first member being at a remote location over a network with respect to the second member;
  wherein invoking the first service includes converting the content into a PDF (Portable Document Format) viewing format; and
  wherein invoking the second service includes converting the content formatted according to the PDF viewing format into a thumbnail rendition of the content, the thumbnail rendition of the content having a reduced resolution format compared to a resolution of the PDF viewing format.

* * * * *